US010233750B2

(12) United States Patent
Samuel et al.

(10) Patent No.: US 10,233,750 B2
(45) Date of Patent: Mar. 19, 2019

(54) METHOD AND SYSTEM FOR PREDICTING DRILLING EVENTS

(71) Applicant: LANDMARK GRAPHICS CORPORATION, Houston, TX (US)

(72) Inventors: Robello Samuel, Houston, TX (US); Olivier R. Germain, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 642 days.

(21) Appl. No.: 14/765,822

(22) PCT Filed: Feb. 27, 2013

(86) PCT No.: PCT/US2013/027958
§ 371 (c)(1),
(2) Date: Aug. 4, 2015

(87) PCT Pub. No.: WO2014/133501
PCT Pub. Date: Sep. 4, 2014

(65) Prior Publication Data
US 2015/0369042 A1    Dec. 24, 2015

(51) Int. Cl.
*E21B 49/00* (2006.01)
*E21B 7/04* (2006.01)
*G05B 13/04* (2006.01)
*E21B 47/022* (2012.01)

(52) U.S. Cl.
CPC ............. *E21B 49/003* (2013.01); *E21B 7/04* (2013.01); *E21B 47/022* (2013.01); *G05B 13/048* (2013.01)

(58) Field of Classification Search
CPC ........ E21B 7/04; E21B 47/022; E21B 49/003; E21B 44/00; G05B 13/048
See application file for complete search history.

(56) References Cited

U.S. PATENT DOCUMENTS 7,243,735 B2 * 7/2007 Koederitz ............... E21B 45/00
                                                    175/40
7,546,884 B2 * 6/2009 Veeningen ................ E21B 7/04
                                                    702/9
8,453,764 B2 * 6/2013 Turner ................. G05B 13/048
                                                    703/10

(Continued)

OTHER PUBLICATIONS

Schlumberger Oilfield Glossary "Mechanical Specific Energy" (accessed 2018) available at <http://www.glossary.oilfield.slb.com/Terms/m/mechanical_specific_energy.aspx>. (Year: 2018).*

(Continued)

*Primary Examiner* — Jay Hann

(57) ABSTRACT

Calculating wellbore energy. At least some of the illustrative embodiments are methods including: calculating an expected wellbore energy for a planned wellpath, the calculating by a computer system; calculating an expected tortuosity of the planned wellpath; calculating a first value indicative of probability of occurrence of a drilling event for drilling along the planned wellpath, the first value based on the expected wellbore energy and the expected tortuosity; and then drilling a wellbore along at least a first portion of the planned wellpath if the first value indicates the probability of the drilling event is less than a predetermined threshold.

17 Claims, 6 Drawing Sheets

(56) References Cited

U.S. PATENT DOCUMENTS

| | | | |
|---|---|---|---|
| 8,504,342 B2* | 8/2013 | Bailey | G06F 17/50 |
| | | | 703/10 |
| 9,598,947 B2* | 3/2017 | Wang | E21B 44/00 |
| 9,784,089 B2* | 10/2017 | Boone | E21B 7/04 |
| 2004/0124009 A1 | 7/2004 | Hoteit et al. | |
| 2004/0168797 A1 | 9/2004 | Barrow | |
| 2009/0250264 A1 | 10/2009 | Dupriest | |
| 2010/0086359 A1 | 4/2010 | Saleniemi | |
| 2011/0220410 A1 | 9/2011 | Aldred et al. | |
| 2012/0160481 A1 | 6/2012 | Williams | |
| 2015/0317585 A1* | 11/2015 | Panchal | E21B 47/022 |
| | | | 705/7.23 |

OTHER PUBLICATIONS

Samuel, R. "A New Well-Path Design Using Clothoid Spiral (Curvature Bridging) for Ultra-Extended-Reach Drilling" SPE 119459 (2010). (Year: 2010).*

Samuel, R. "Friction Factors: What are They for Torque, Drag, Vibration, Bottom Hole Assembly and Transient Surge/Swab Analyses?" IADC/SPE 128059 (2010). (Year: 2010).*

European Patent Office, Supplementary European Search Report, dated Aug. 3, 2016, 7 pages, Europe.

International Search Report and Written Opinion, dated Oct. 16, 2013, 15 pages; Korean International Searching Authority.

Robello, Samuel, Halliburton, Xiushan Liu, Sinopec, Wellbore Tortuosity, Torsion, Drilling Indices, and Energy: What do They have to do with Well Path Design?, Oct. 4-7, 2009, 14 pages, 2009 SPE Annual Technical Conference and Exhibition, New Orleans, Louisiana, USA.

* cited by examiner

*FIG.5*
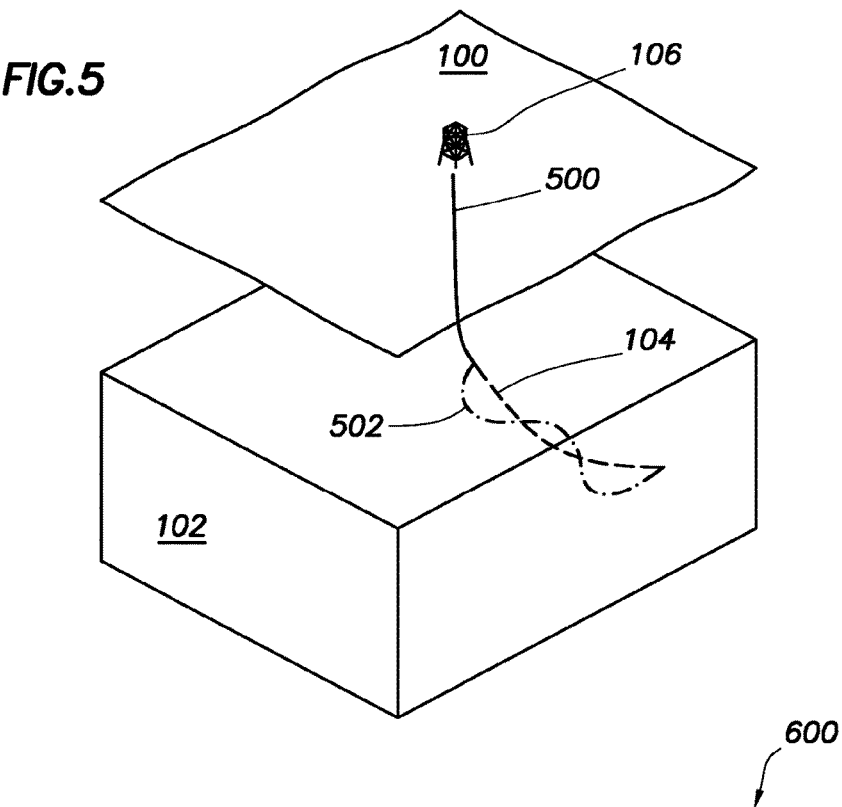
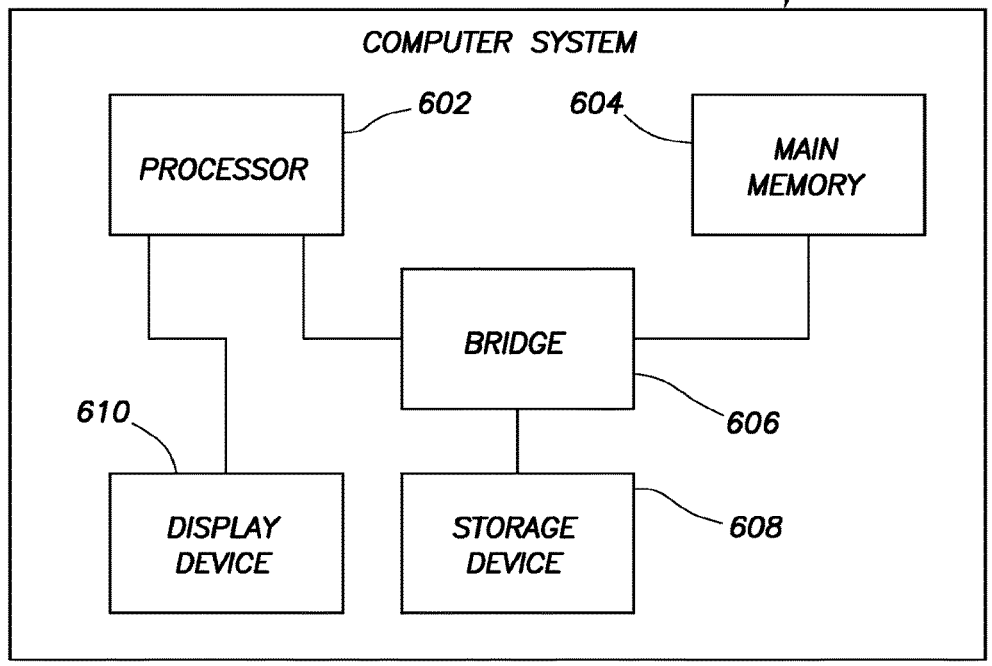
*FIG.6*

METHOD AND SYSTEM FOR PREDICTING DRILLING EVENTS

CROSS-REFERENCE TO RELATED APPLICATIONS

This application is a U.S. National Stage patent application of International Patent Application No. PCT/US2013/027958, filed on Feb. 27, 2013, the benefit of which is claimed and the disclosure of which is incorporated herein by reference in its entirety.

BACKGROUND

A number of issues may arise when drilling a well into a hydrocarbon bearing formation. The issues that arise may be a result of the formation itself, or the quality of the wellpath. In some cases, there may be a correlation between the undulations present in the wellpath and drilling issues.

BRIEF DESCRIPTION OF THE DRAWINGS

For a detailed description of exemplary embodiments, reference will now be made to the accompanying drawings in which:

FIG. 5 shows a perspective cutaway view of a portion of a hydrocarbon bearing formation in accordance with at least some embodiments;

FIG. 6 shows, in block diagram form, a computer system in accordance with at least some embodiments.

NOTATION AND NOMENCLATURE

Figure 1:
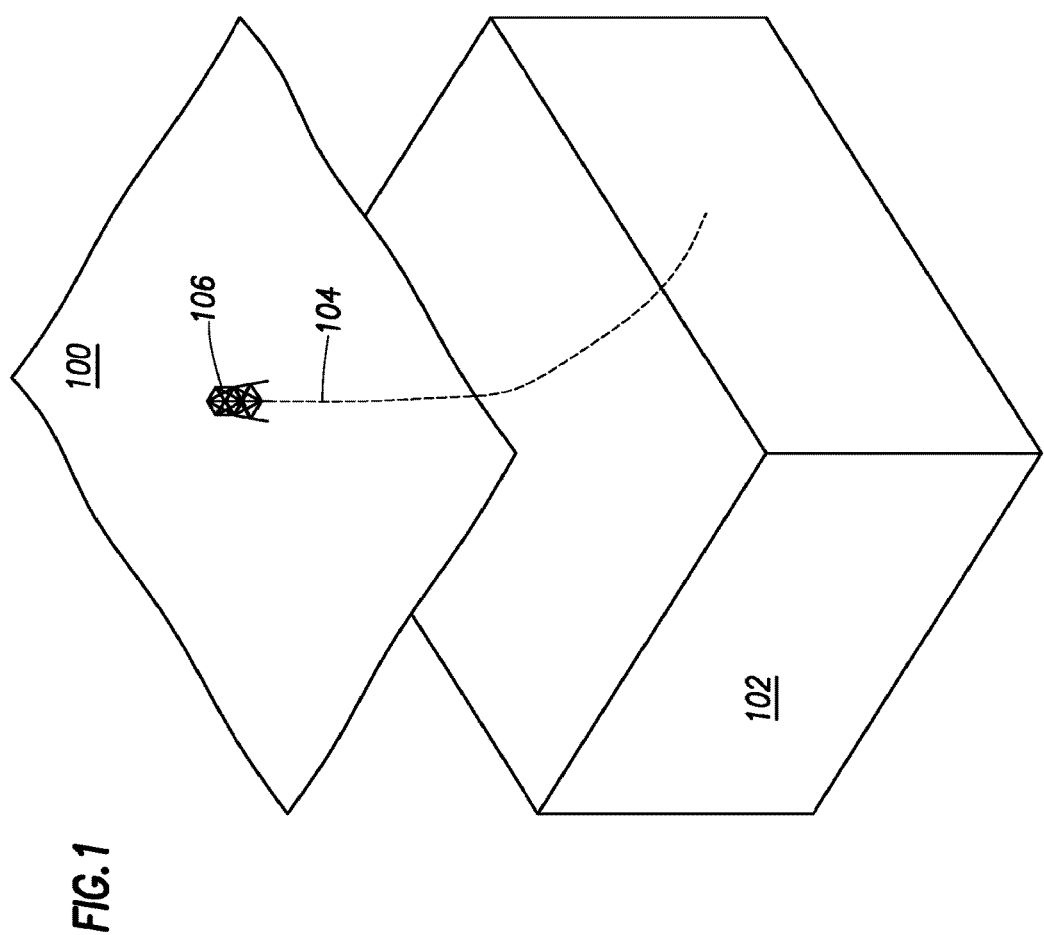
FIG. 1 shows a perspective cutaway view of a portion of a hydrocarbon bearing formation in accordance with at least some embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connect. Thus, if a first device couples to a second device, that connection may be through a direct connection or through an indirect connection via other devices and connections.

"Wellbore" shall mean a hole drilled into the Earth's crust used directly or indirectly for the exploration or extraction of natural resources, such as oil, natural gas, or water.

"Wellpath" shall mean an actual or planned trajectory of a wellbore.

"Wellbore energy" shall mean a value indicative of an amount of energy needed to deform a theoretical metallic object having a length into a shape traced out by at least a portion of a wellpath.

"Dogleg severity" shall mean a value related to the overall curvature of a wellpath between measurement locations.

"Planned wellbore energy" shall mean a wellbore energy calculated with respect to a planned trajectory of a wellbore.

"Actual wellbore energy" shall mean a wellbore energy calculated with respect to a portion or all of an actual trajectory of a wellbore.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to methods and systems of predicting the occurrence of a drilling event by calculating the tortuosity and wellbore energy of a planned wellpath. In particular, the wellbore energy of a planned wellpath is calculated in order to determine the probability a drilling event might occur based, in part, on the tortuosity of the planned wellpath. If it is determined the tortuosity of the planned wellpath is likely to yield drilling issues, the planned wellpath may be altered or a drilling parameter may be changed in order to lower the probability of the occurrence of a drilling event. Furthermore, once drilling has commenced, further tortuosity and wellbore energy calculations may be made on both the drilled portion and the remaining undrilled portion in order to make any desired adjustments. The specification first turns to a high level overview.

FIG. 1 shows a perspective cutaway view of a portion of the earth's crust. In particular, FIG. 1 shows the surface 100 of the earth. Below the surface 100 is a portion of a hydrocarbon bearing formation 102. The overburden layers between the surface 100 and the hydrocarbon bearing formation 102 are not shown so as to not unduly complicate the figure. FIG. 1 also shows a planned wellpath 104 extending through the hydrocarbon bearing formation. Planned wellpath 104 is associated with derrick 106.

In one embodiment, the efficiency of drilling planned wellpath 104 depends, in part, on the quality of planned wellpath 104, where the quality of a planned wellpath may be thought of as the "smoothness" of the wellpath. A "smoother" wellpath may be indicative of a more efficient drilling operation. For example, a smoother wellpath may be associated with a lower probability of the occurrence of certain drilling events, thus saving time and money. On the other hand, a less smooth wellpath may be indicative of a less efficient drilling operation. For example, a wellpath with many curves or spirals may increase the possibility of the occurrence of a drilling event, thus leading to higher costs and more time expended. The occurrence of such drilling events may include, but are not limited to: a stuck-pipe situation; a collapse of the wellbore; a tight hole; or excessive torque and drag.

Several parameters and various drilling indices may be used to quantify the smoothness of the wellpath or to estimate the difficulty of drilling a planned wellpath. Examples of parameters considered in quantifying the smoothness of the wellpath may include calculations of dogleg severity, the curvature of the wellpath, spiraling, tortuosity, and the wellbore energy. In addition, although not to be discussed in any significant detail, drilling indices associated with the planned wellpath may be calculated using a plurality of wellbore drilling complexity indices such as: the directional difficulty index ("DDI"); the difficulty index ("DI"); the mechanical risk index ("MRI"); and the modified mechanical risk index ("MMRI").

The wellbore energy of a wellpath is one parameter that may provide useful information in predicting the probability that an event will occur during drilling. Wellbore energy, which will be described in more detail below, may be considered alongside with the tortuosity of a wellpath, where a wellpath having a greater tortuosity may have a greater wellbore energy, and thus a greater probability of experiencing a drilling event. The expected tortuosity and actual tortuosity of a section of planned wellpath 104 is described in more detail below.

Figure 2:
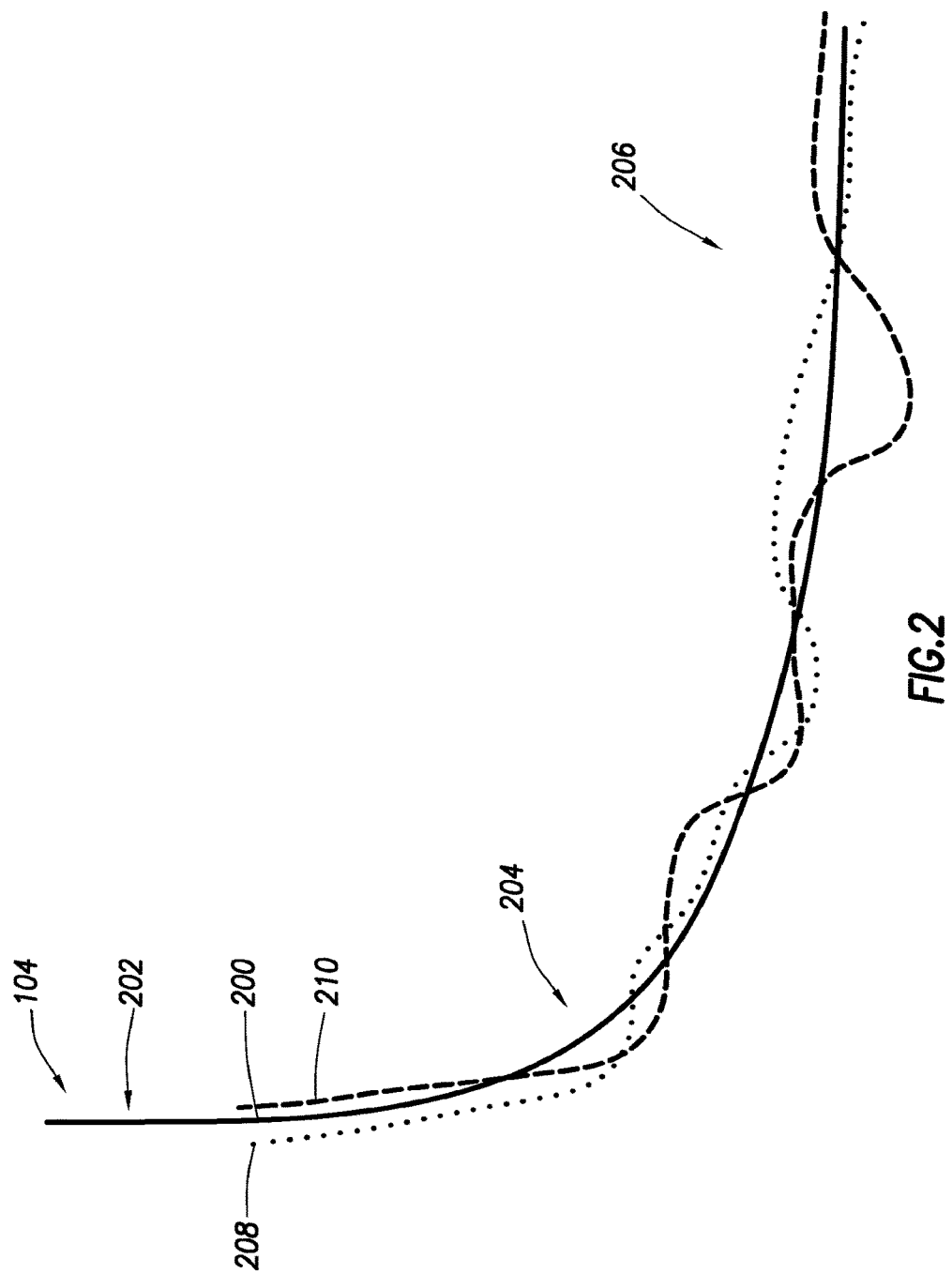
FIG. 2 shows an elevation view of a planned wellpath in accordance with at least some embodiments.

FIG. 2 shows a cutaway elevation view of a section of a planned wellpath. In particular, FIG. 2 shows several wellpaths to convey ideas regarding tortuosity. At initial stages of design, the planned wellpath may be a smooth line 200 defining substantially vertical portion 202, a curved portion 204, and a substantially horizontal portion 206. However, while smooth line 200 may define the planned wellpath 104, it is highly unlikely that during actual drilling the wellbore can or will precisely follow the planned wellpath along smooth line 200. Rather, in drilling wellbores at great distances from the surface (e.g., 4000 feet or more), and drilling substantially horizontal portions of a wellbore, undulations in the actual wellpath are likely. Thus, in order to predict the likelihood of occurrence of drilling events, a planned wellpath may be associated with an expected tortuosity, as shown by wellpath 208 (dotted line, exaggerated in scale for clarity). That is, for purposes of predicting drilling events, a planned wellpath may be modulated based on the expected tortuosity. As illustrated, the planned wellpath 208 comprising the expected tortuosity follows along the wellpath 104 defined by smooth line 200 in a general sense, but undulates around the path. The amount of expected tortuosity may be based on information from a plurality of sources, such as historical data from previously drilled wells having similar parameters, or data from offset wells. It is to be understood that in actually drilling a wellbore along the wellpath, the smooth line 200 represents the planned wellpath 104, and in drilling the actual wellbore no attempt will be made to follow the modulated wellpath 208. The modulated wellpath 208 is merely used in wellbore energy calculations, discussed more below. Finally, FIG. 2 shows an illustrative actual wellpath 210 (dashed lines) in the situation where actual tortuosity is greater than the expected tortuosity (and again the tortuosity is exaggerated in the figure for purposes of explanation). The specification now turns to an overview of wellbore energy.

Figure 3B:
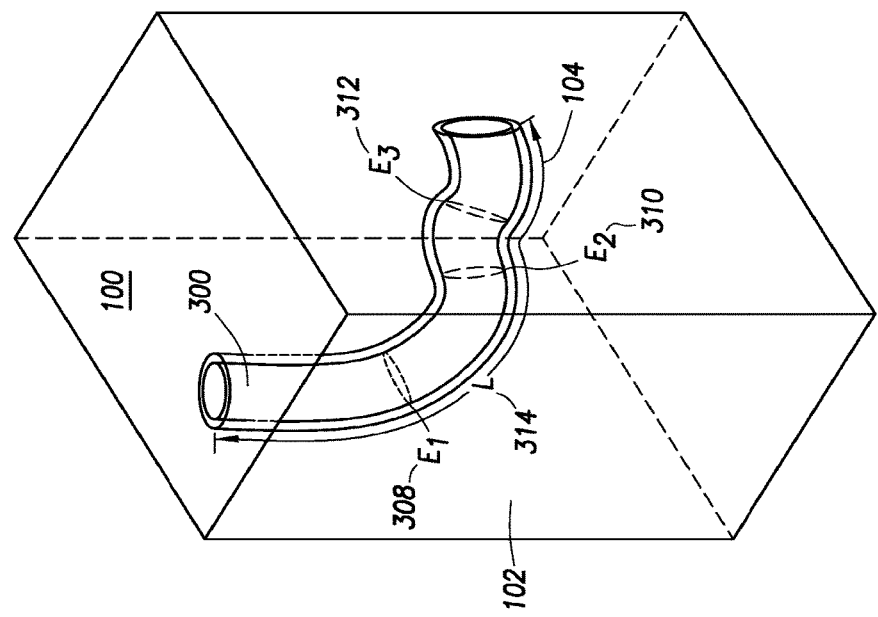
FIG. 3B shows a perspective cutaway view of a solid cylinder theoretically placed within a planned wellpath in accordance with at least some embodiments.
Figure 3A:
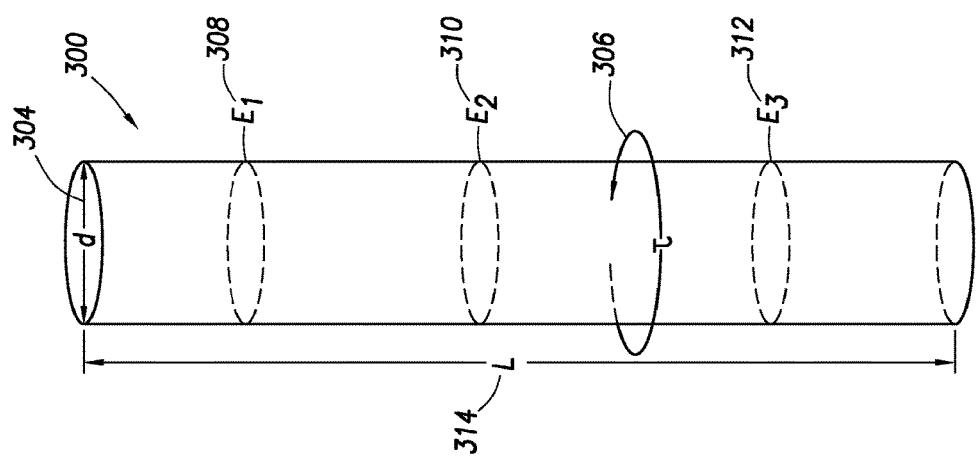
FIG. 3A shows a perspective view of solid cylinder in accordance with at least some embodiments.

FIG. 3A shows a perspective view an example solid cylinder 300. Cylinder 300 may be comprised of any material, as the measurements taken with regard to cylinder 300 are compared relative to subsequent or previous measurements made regarding the same cylinder 300. In one embodiment, cylinder 300 is considered to have a length 314 "L" equal to the length of the planned wellpath. When calculating a wellbore energy for a portion of a drilled wellbore, length "L" is considered to have a length equal to the drilled portion of a wellpath. In yet another embodiment, length "L" may be equal to the remaining undrilled, but previously planned, portion of a partially drilled wellpath. Cylinder 300 is considered to have a diameter "d" 304 which may be equal to the diameter within the planned wellpath. In addition, the torsional stress associated by twisting cylinder 300 may be associated with torsion 304 τ.

Calculating wellbore energy in accordance with example systems involves calculating an amount of energy needed to bend and twist the cylinder 300 into the shape of the actual or planned wellpath for which a wellbore energy is to be calculated. It is to be understood that at no point is an actual solid cylinder contorted into the shape of a planned wellpath, and at no point is an actual solid cylinder placed within a wellbore as part of calculating wellbore energy associated with a drilled portion of the wellbore. The exercise is purely a mathematical endeavor. Cylinder 300 may be logically (but not physically) divided into sections corresponding to particular areas of interest within a wellpath, as shown more specifically in FIG. 3B. In both FIG. 3A and in FIG. 3B, positions 308, 310, and 312 represent measurement locations $E_1$, $E_2$, and $E_3$, respectively. Measurement locations may be logically placed at any location along the cylinder 300 or within planned wellpath 104.

In FIG. 3B, cylinder 300 is shown as theoretically inserted within planned wellpath 104. In particular, using some theoretical amount of energy, cylinder 300 has been formed to the curvature of wellpath 104. Both cylinder 300 and wellpath 104 have the same length 314 "L," with each section of cylinder 300 delineated by measurement locations 308, 310, and 312 corresponds to a section of the well path having some curvature.

The more energy required to theoretically bend and twist cylinder 300 to match wellpath 104, the higher the wellbore energy value. For a smooth wellpath (e.g., a wellbore that follows smooth line 200 of FIG. 2), less energy would be theoretically required to bend and twist the cylinder 300 to match the wellpath; by contrast, for a wellpath with more tortuosity (e.g., wellpath 210 of FIG. 2), more energy would be theoretically required to bend and twist the cylinder 300 to match the wellpath. The higher the wellbore energy value, the higher the probability that a drilling event may occur during drilling. For example, in one embodiment, a higher wellbore energy value may be indicative of increased the likelihood of stuck pipe events. In part, calculating the expected wellbore energy for planned wellpath 104 may be based on the tortuosity of the planned wellpath. Thus, the expected wellbore energy calculation yields a value which may be indicative of the probability of the occurrence of a drilling event within the planned well path.

Figure 4:
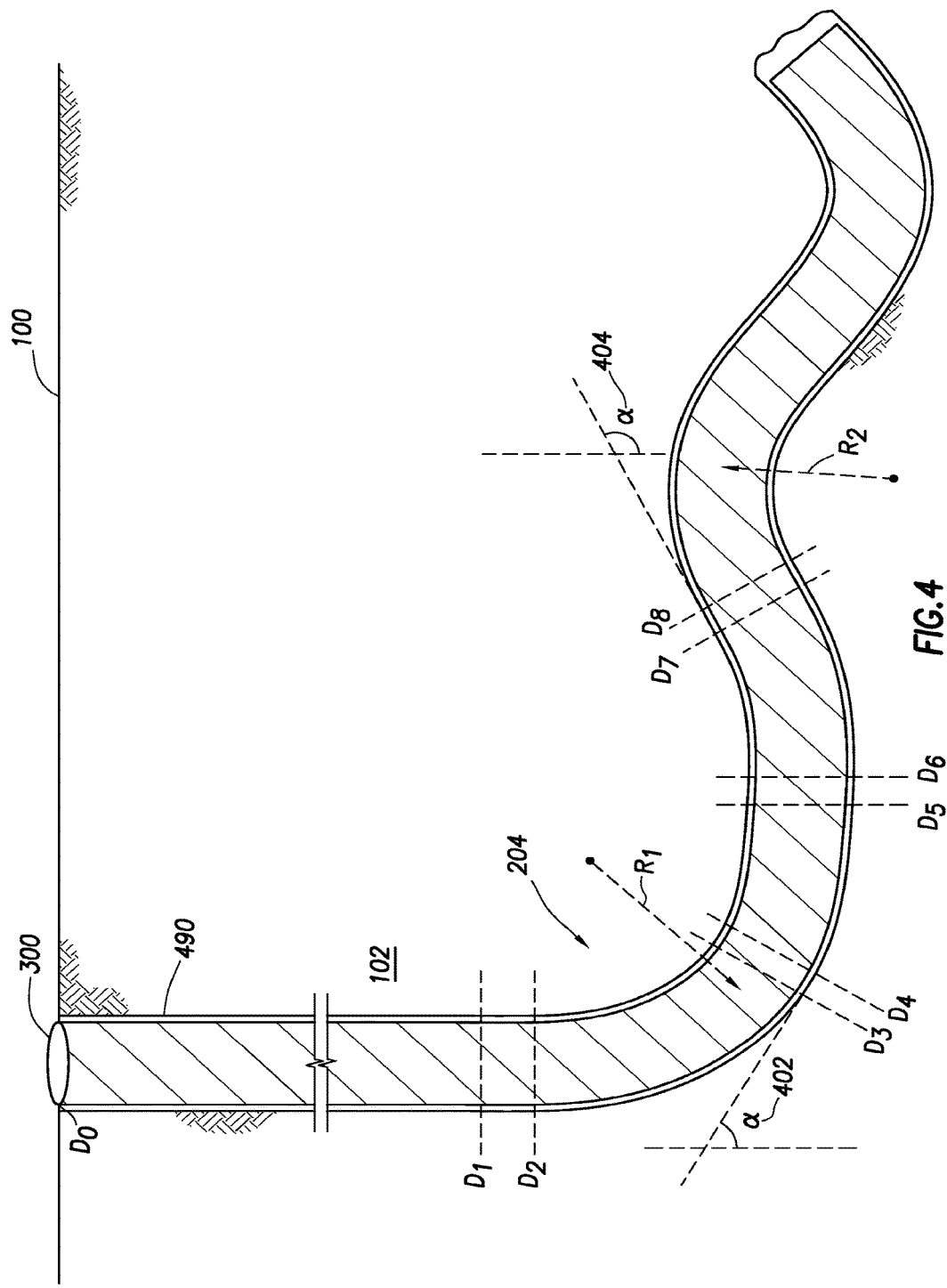
FIG. 4 shows a cutaway elevation view of a solid cylinder theoretically placed within a planned wellpath in accordance with at least some embodiments.

FIG. 4 shows a cutaway elevation view of bending and holding cylinder 300 within planned wellpath 104 in accordance with some embodiments. Again, placing of the cylinder 300 in an actual wellbore is a theoretical exercise, and FIG. 4 shall not be viewed to require actual placement of a cylinder 300 as part of calculating wellbore energy in accordance with the example systems. Moreover, the tortuosity of the wellpath in FIG. 4 is highly exaggerated in relation to the diameter of the wellbore so as to convey concepts regarding calculating tortuosity. FIG. 4 shows the surface of the earth 100, and below the surface, a portion of hydrocarbon bearing formation 102. Within hydrocarbon bearing formation 102 is actual wellpath 490 with cylinder 300 inserted, bent, and held within actual wellpath 490.

In some embodiments, the wellbore energy is calculated alongside a tortuosity calculation associated with the wellpath. The tortuosity of a wellpath may be calculated by equation (1) below:

$$T = \sum_{i=1}^{n} \frac{\alpha_{n-1} + (\Delta D \times \delta_i)}{D_i - D_{i-1}} \quad (1)$$

where T is the calculated tortuosity of the wellpath; α is an inclination angle of the wellpath between two measurement locations, defined as angle between a tangent line along the planned or actual wellpath and a vertical line; ΔD is a distance between two measurement locations in relation to a dogleg severity calculation; $\delta_i$ is a dogleg severity value at measurement location i; and $D_i$ is a depth at a measurement location i. In the example embodiment shown in FIG. 4, the inclination angle between measurement locations D1 and D2 may be zero degrees inasmuch as the wellbore is vertical between the measurement locations, and the dogleg severity for the portion of the wellbore defined between measurement locations D1 and D2 may be zero. By contrast, the angle α 402 between a tangent line between measurement locations D3 and D4 and a vertical line may be about 45 degrees, and the dogleg severity for the portion of the wellbore defined between measurement locations D3 and D4 may be non-zero related to the radius of curvature $R_1$ for the curved section 204. As a further example, the angle between measurement locations D5 and D6 may be 90 degrees inasmuch as the wellbore is horizontal between the measurement locations, and the dogleg severity for the portion of the wellbore defined between measurement locations D5 and D6 may be zero. As a final example, the angle α 404 between measurement locations D7 and D8 may be about 120 degrees (drilling up), and the dogleg severity for the portion of the wellbore defined between measurement locations D7 and D8 may be non-zero and related to the radius of curvature $R_2$.

Before proceeding it should be understood that the measurement locations of FIG. 4 are merely illustrative. In some cases, a portion or all the wellbore is logically divided into measurement locations with predetermined and periodic spacing (e.g., every 100 feet along the planned or actual wellpath, every 500 feet along the planned or actual wellpath). Moreover, each measurement location may be associated with both the uphole measurement location, and downhole measurement location. For example, while measurement location D2 is the downhole location associated with the D1/D2 pair, measurement location D2 is the uphole measurement location associated with the next measurement location (which is not specifically shown in FIG. 4), and the tortuosity calculation may likewise include components based on the parameters associated with the wellbore defined between D2 and the next periodically spaced measurement location.

The wellbore energy required to bend, twist, and hold cylinder 300 within wellpath 104 may be calculated by equation (2) below:

$$E_{exp} = \sum_{i=1}^{n} \left( \frac{(\kappa_i^2 + \tau_i^2)\Delta Di}{D_n + \Delta D_n} \right) \quad (2)$$

where $E_{exp}$ is the expected wellbore energy; n is the total number of measurement locations along the wellpath; $\kappa_i$ is a wellbore curvature (or dogleg severity measurement) at the measurement location i; $\tau_i$ is the torsion at the measurement location i; ΔDi is a change in depth at the measurement location i; $D_n$ is a depth at survey point i, and $\Delta D_n$ is a change in depth across a plurality of measurement locations.

In one embodiment, predicting the occurrence of drilling events may be achieved by considering together the separately calculated wellbore energy value and the separately calculated tortuosity. The following equation shows one example method of combining the wellbore energy and tortuosity to arrive at a value indicative of the occurrence of drilling events:

$$C = \frac{A(E_{exp})^x + B(T)^y}{Avg(E_{exp}, T)} \quad (3)$$

where C is the combined value indicative of the probability of the occurrence of a drilling event; A is a positive, non-zero constant indicative of a weighted value assigned to the expected wellbore energy; $E_{exp}$ is the expected wellbore energy; x is a non-zero constant; B is a positive, non-zero constant indicative of a weighted value assigned to the tortuosity; T is the tortuosity of the wellpath; y is a non-zero constant; and Avg is an averaging operation.

If the calculated wellbore energy yields a value exceeding a predetermined threshold, that value may indicate a higher-than-desired probability that at least one drilling event may occur when drilling commences. If the wellbore energy value is higher than the predetermined threshold, parameters associated with the planned wellpath may be adjusted to bring the value to a desired level. Adjustment of planned wellpath parameters may include, but are not limited to: adjusting the trajectory of at least a portion of the planned wellpath; changing the diameter of at least a portion of the planned wellpath; or changing the depth to which a casing may be installed.

After one or more parameters related to planned wellpath 104 have been adjusted, calculations of tortuosity and wellbore energy may be repeated, the results analyzed, and parameters adjusted again, if necessary. Once the calculations yield acceptable results, drilling may commence on the planned wellpath, as shown in FIG. 5.

FIG. 5 shows a perspective cutaway view of a portion of the hydrocarbon bearing formation in accordance with at least some embodiments. In particular, FIG. 5 shows a portion of previously planned wellpath 104 located at the end of now partially drilled wellbore 500. In this example, the remaining undrilled section of planned wellpath 104 may be associated with an expected tortuosity 502 (again, exaggerated for clarity). After drilling has begun, the engineer may decide to recalculate the wellbore energy for the now-partially drilled wellpath using the same methods as described previously with respect to the planned wellpath 104. The wellbore energy for a partially drilled well may be a combination of calculations made on the actual tortuosity and actual wellbore energy with respect to wellbore 500, along with the expected tortuosity and expected wellbore energy in the undrilled section of wellpath 104.

As with planned wellpath 104, if the wellbore energy value ascertained in the partially drilled well indicates there is a higher-than-desired likelihood of the occurrence of drilling events, then adjustments may be made. In addition to similar parameter adjustments associated with the undrilled portion of planned wellpath 104 discussed previously, additional adjustments may be made to wellbore 500. Adjustments to both the drilled and undrilled sections of wellpath may include, but are not limited to: adjusting the trajectory of a portion of the planned wellpath; changing the diameter of at least a portion of the planned wellpath; casing a portion of the wellbore, changing the diameter of a portion of the wellbore, or redrilling a portion of the wellbore.

A wellbore effective energy index, or a trailing indicator which may be used to measure the increasing risk of bad events, may also be calculated by equation (4) below:

$$EI = \frac{E_{exp}}{E_{act}} \qquad (4)$$

where EI is the wellbore effective energy index; $E_{exp}$ is the expected wellbore energy for the undrilled section of the wellpath; and $E_{act}$ is the actual calculated wellbore energy for the drilled section of the wellpath.

In particular, with either single or multiple wells, calculated expected values of either or both tortuosity and wellbore energy are compared to actually measured values, the trend in the values is established, and weighting values are assigned. As additional values are calculated, they may be analyzed in view of the trended values, where a deviation from the trended values may provide additional information related to the potential of the occurrence of a drilling event.

In addition to predicting drilling events for one wellpath, it may be possible to estimate tortuosity, and thus predict drilling events, using a combination of methods in the form of a tortuosity index. In particular, tortuosity values ascertained from nearby wells which have experienced drilling events may be gathered and distributed into a normal distribution curve.

A head tortuosity index, or a value indicative of the upper end of the normalized curve, may be defined as the ratio of the entropy of the head to the overall tortuosity data, and may be calculated by equation (5) below:

$$\frac{E_h}{E_r} = \sum_{i=1}^{n} \frac{p_h(x)\log(x)}{p_r(x)\log(x)} \qquad (5)$$

where $E_h$ is the entropy of the head portion of the curve; $E_r$ is the entropy of the entire curve; i is an index point along the curve, n is the total number of index points along the curve; $p_h$ is the probability of the occurrence of x along the head portion of the curve; and $p_r$ is the probability of the occurrence of x along the entire curve.

Likewise, a tail tortuosity index, or a value indicative of the lower end of the normalized curve, may be defined as the ratio of the entropy of the tail to the overall tortuosity data, and may be calculated by equation (6) below:

$$\frac{E_t}{E_r} = \sum_{i=1}^{n} \frac{p_t(x)\log(x)}{p_r(x)\log(x)} \qquad (6)$$

where $E_h$ is the entropy of the tail portion of the curve; $E_r$ is the entropy of the entire curve; i is an index point along the curve, n is the total number of index points along the curve; $p_h$ is the probability of the occurrence of x along the tail portion of the curve; and $p_r$ is the probability of the occurrence of x along the entire curve.

When either ratio begins to increase, such an increase may be indicative of a higher probability of a drilling event occurrence.

In addition to the method of predicting drilling events from calculating wellbore energy, other predictive models may be used in tandem. For example, other methods may include: least squares regression; neural networks; fuzzy system; hybrid neural-fuzzy system; rule based; case based; and decision trees. Furthermore, although the specification has focused on calculating wellbore energy for one wellpath, it is possible that drilling event predictions may also be considered for both single and multiple wells. That is, the system may implement machine learning based on the real-time, actual values of wellbore energy and tortuosity, the expected values for the undrilled portion of the wellpath, and actual values from nearby "offset" wells that have (or have not) experienced drilling issues to predict the likelihood of a drilling event for the current well. For example, if an offset well is being drilled, and the drilling has advanced further along the planned wellpath than drilling along a wellbore under consideration, and the offset well experiences a drilling event, the overall system may "learn" from that event, and update the drilling event prediction for the current well. In other words, events that occur in other wells may change the prediction of a drilling even in the current well in spite of the fact that actual and expected values for the current borehole have not changed appreciably.

FIG. 6 illustrates in greater detail a computer system 600 which may be used to calculate tortuosity and wellbore energy, and may also be used to calculate probability values indicative of the occurrence of drilling events. The computer system 600 comprises a processor 602, and the processor couples to a display device 610 and a main memory 604 by way of a bridge device 606. It is on the display device 610 that the various tortuosity and wellbore energy values may be displayed, or the probability of the occurrence of a drilling event may be displayed. Moreover, the processor 602 may couple to a long term storage device 608 (e.g., a hard drive, solid state disk, memory stick, optical disc) by way of the bridge device 606. Programs executable by the processor 602 may be stored on the storage device 608, and accessed when needed by the processor 602. In some cases, the programs are copied from the storage device 608 to the main memory 604, and the programs are executed from the main memory 604. Thus, the main memory 604, and storage device 608 shall be considered computer-readable storage mediums.

Figure 7:
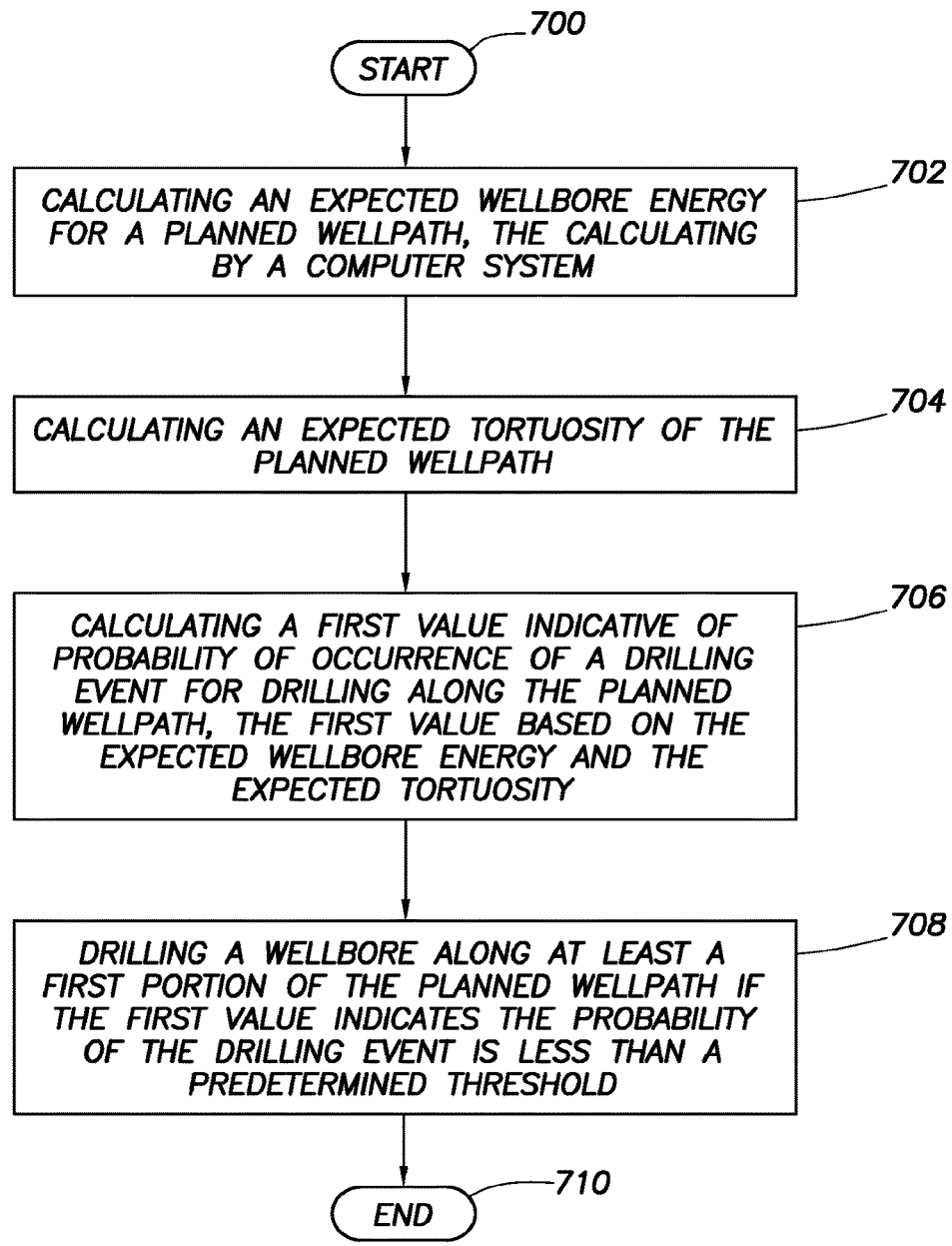
FIG. 7 shows a flow diagram depicting an overall method in accordance with at least some embodiments.

FIG. 7 shows a flow diagram depicting an overall method, some of which may be performed as a program executing on a processor. The method starts (block 700) with calculating an expected wellbore energy for a planned wellpath, the calculating by a computer system (block 702); calculating an expected tortuosity of the planned wellpath (block 704); calculating a first value indicative of probability of occurrence of a drilling event for drilling along the planned wellpath, the first value based on the expected wellbore energy and the expected tortuosity (block 706); and then drilling a wellbore along at least a first portion of the planned wellpath if the first value indicates the probability of the drilling event is less than a predetermined threshold (block 708). Thereafter, the method ends (block 710).

At least some embodiments are methods comprising: calculating an expected wellbore energy for a planned wellpath, the calculating by a computer system; calculating an expected tortuosity of the planned wellpath, calculating a first value indicative of probability of occurrence of a drilling event for drilling along the planned wellpath, the first value based on the expected wellbore energy and the expected tortuosity; and then drilling a wellbore along at least a first portion of the planned wellpath if the first value indicates the probability of the drilling event is less than a predetermined threshold.

Other embodiments may also comprise, prior to drilling, adjusting a parameter associated with the planned wellpath if the first value indicates the probability of the drilling event is greater than a predetermined threshold.

Other embodiments may also comprise adjusting at least one parameter selected from the group consisting of: trajectory of at least a portion of the planned wellpath; diameter of at least a portion of the planned wellpath; drilling fluid to be used during drilling of at least a portion of the planned wellpath; curvature of at least a portion of the planned wellpath; length of the planned wellpath; and depth to which a casing is to be installed in the planned wellpath.

Other embodiments may also comprise: calculating an actual wellbore energy for the wellbore, the calculating by the computer system; combining the actual wellbore energy with a portion of the expected wellbore energy, the portion of the expected wellbore energy attributable to a second portion of the wellpath, the second portion corresponding to an undrilled portion of the planned wellpath, and the combining creates a combined wellbore energy value; calculating a second value indicative of probability of occurrence of a drilling event for drilling along the second portion of the planned wellpath, the second value based on the combined wellbore energy value; and then drilling the wellbore along the second portion of the planned wellpath if the second value indicates the probability of the drilling event is less than a predetermined threshold.

Other embodiments may also comprise, prior to drilling along the second portion of the planned wellbore path, adjusting a parameter associated with the second portion of the planned wellpath if the second value indicates the probability of the drilling event is greater than a predetermined threshold.

Other embodiments may also comprise, prior to drilling along the second portion of the planned wellbore path, changing a feature of the wellbore.

Other embodiments may also comprise changing a feature of the wellbore, wherein the feature changed is selected from the group consisting of: casing a portion of the wellbore; changing the diameter of a portion of the wellbore; re-drilling a portion of the wellbore.

Other embodiments may be computer systems comprising: a processor; a memory coupled to the processor; a display device coupled to the processor wherein the memory stores a program that, when executed by the processor, causes the processor to calculate an expected wellbore energy for a planned wellpath; calculate an expected tortuosity of the planned wellpath; and then calculate a first value indicative of probability of occurrence of a drilling event for drilling along the planned wellpath, the first value based on the expected wellbore energy and the expected tortuosity.

The program may also cause the processor to calculate an actual wellbore energy for the wellbore; combine the actual wellbore energy with a portion of the expected wellbore energy, the portion of the expected wellbore energy attributable to a second portion of the wellpath, the second portion corresponding to an undrilled portion of the planned wellpath, and the combining creates a combined wellbore energy value; and then calculate a second value indicative of probability of occurrence of a drilling event for drilling along the second portion of the planned wellpath, the second value based on the combined wellbore energy value.

Other embodiments are computer-readable mediums storing instructions that, when executed by a processor, cause the processor to: calculate an expected wellbore energy for a planned wellpath; calculate an expected tortuosity of the planned wellpath; and then calculate a first value indicative of probability of occurrence of a drilling event for drilling along the planned wellpath, the first value based on the expected wellbore energy and the expected tortuosity.

The program may also cause the processor to: calculate an actual wellbore energy for the wellbore; combine the actual wellbore energy with a portion of the expected wellbore energy, the portion of the expected wellbore energy attributable to a second portion of the wellpath, the second portion corresponding to an undrilled portion of the planned wellpath, and the combining creates a combined wellbore energy value; and then calculate a second value indicative of probability of occurrence of a drilling event for drilling along the second portion of the planned wellpath, the second value based on the combined wellbore energy value.

It is noted that while theoretically possible to perform some or all the calculations discussed above by a human using only pencil and paper, the time measurements for human-based performance of such tasks may range from man-hours to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiment," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms calculating a tortuosity value of a wellpath and calculating a wellbore energy of a wellpath, this context shall not be read as a limitation as to the scope of one or more of the embodiments described—the same techniques may be used for other embodiments. It is intended that the following claims be interpreted to embrace all such variations and modifications.

We claim:
1. A method comprising:
calculating an expected wellbore energy for a planned wellpath, the calculating by a computer system;

calculating an expected tortuosity of the planned wellpath;

calculating a first value indicative of probability of occurrence of a drilling event for drilling along the planned wellpath, based on the expected wellbore energy and the expected tortuosity;

drilling a wellbore along the planned wellpath when the first value indicates the probability of the drilling event is less than a predetermined threshold;

measuring an actual wellbore energy for a first portion of the planned wellpath, the first portion corresponding to a drilled portion of the planned wellpath;

combining the actual wellbore energy with a portion of the expected wellbore energy to create a combined wellbore energy value, the portion of the expected wellbore energy attributable to a second portion of the planned wellpath, the second portion corresponding to an undrilled portion of the planned wellpath;

calculating a second value indicative of probability of occurrence of a drilling event for drilling along the second portion of the planned wellpath, based on the combined wellbore energy value; and drilling the wellbore along the second portion of the planned wellpath when the second value indicates the probability of the drilling event is less than a predetermined threshold.

2. The method of claim 1, further comprising, prior to drilling, adjusting a parameter associated with the planned wellpath when the first value indicates the probability of the drilling event is greater than a predetermined threshold.

3. The method of claim 2, wherein the parameter associated with the planned wellpath is selected from the group consisting of: a trajectory of at least a portion of the planned wellpath; a diameter of at least a portion of the planned wellpath; a drilling fluid to be used during drilling of at least a portion of the planned wellpath; a curvature of at least a portion of the planned wellpath; a length of the planned wellpath; and a depth to which a casing is to be installed in the planned wellpath.

4. The method of claim 1, further comprising, prior to drilling along the second portion of the planned wellbore path, adjusting a parameter associated with the second portion of the planned wellpath when the second value indicates the probability of the drilling event is greater than a predetermined threshold.

5. The method of claim 1, further comprising, prior to drilling along the second portion of the planned wellbore path, changing a feature of the wellbore.

6. The method of claim 5, wherein changing a feature of the wellbore comprises at least one of: casing a portion of the wellbore; changing a diameter of a portion of the wellbore; or re-drilling a portion of the wellbore.

7. The method of claim 1, further comprising calculating an actual tortuosity using an equation as follows:

$$T = \sum_{i=1}^{n} \frac{\alpha_{n-1} + (\Delta D \times \delta_i)}{D_i - D_{i-1}}$$

where T is the actual tortuosity of the wellbore; $\alpha$ is an inclination angle of the wellbore; $\Delta D$ is a distance between a first measurement location within the wellbore and a second measurement location within the wellbore; $\delta_i$ is a dogleg severity value; and $D_i$ is a depth along the wellbore at a measurement location i.

8. The method of claim 1, wherein the expected tortuosity is calculated using an equation as follows:

$$T = \sum_{i=1}^{n} \frac{\alpha_{n-1} + (\Delta D \times \delta_i)}{D_i - D_{i-1}}$$

where T is the expected tortuosity of the wellpath; $\alpha$ is an inclination angle of the wellpath; $\Delta D$ is a distance between a first measurement location within the wellpath and a second measurement location within the wellpath; $\delta_i$ is a dogleg severity value; and $D_i$ is a depth along the wellpath at a survey location i.

9. The method of claim 1, wherein the expected wellbore energy is calculated using an equation as follows:

where $E_{exp}$ is the expected wellbore energy across a plurality of measurements locations n; i is an index representing measurement locations along the expected wellpath; $\kappa_i$ is a wellbore curvature at the measurement location i; $\tau_i$ is the expected tortuosity at the measurement location I; $\Delta D_i$ is a change in depth at the measurement location i; $D_n$ is a depth at survey point I; $\Delta D_n$ is a change in depth across a plurality of measurement locations n; and where $D_n + \Delta D_n$ is a total length between depths.

10. A system comprising:
a processor;
a memory coupled to the processor;
a display device coupled to the processor;
wherein the memory stores a program that, when executed by the processor, causes the processor to:
calculate an expected wellbore energy for a planned wellpath;
calculate an expected tortuosity of the planned wellpath;
calculate a first value indicative of probability of occurrence of a drilling event for drilling along the planned wellpath, based on the expected wellbore energy and the expected tortuosity;
measure an actual wellbore energy for a first portion of the planned wellpath, the first portion corresponding to a drilled portion of the planned wellpath;
combine the actual wellbore energy with a portion of the expected wellbore energy to create a combined wellbore energy value, the portion of the expected wellbore energy attributable to a second portion of the wellpath, the second portion corresponding to an undrilled portion of the planned wellpath; and
calculate a second value indicative of probability of occurrence of a drilling event for drilling along the second portion of the planned wellpath, based on the combined wellbore energy value.

11. The system of claim 10, wherein the program further causes the processor to calculate an actual tortuosity based on an equation as follows:

$$T = \sum_{i=1}^{n} \frac{\alpha_{n-1} + (\Delta D \times \delta_i)}{D_i - D_{i-1}}$$

where T is the actual tortuosity of the wellbore; $\alpha$ is an inclination angle of the wellbore; $\Delta D$ is a distance between a first measurement location within the wellbore and a second measurement location within the wellbore; $\delta_i$ is a dogleg severity value; and $D_i$ is a depth along the wellbore at a measurement location i.

12. The system of claim 10, wherein the expected tortuosity is calculated based on an equation as follows:

$$T = \sum_{i=1}^{n} \frac{\alpha_{n-1} + (\Delta D \times \delta_i)}{D_i - D_{i-1}}$$

where T is the expected tortuosity of the wellpath; α is an inclination angle of the wellpath; ΔD is a distance between a first measurement location within the wellpath and a second measurement location within the wellpath; $\delta_i$ is a dogleg severity value; and $D_i$ is a depth along the wellpath at a survey location i.

13. The system of claim 10, wherein the expected wellbore energy is calculated based on an equation as follows:
where $E_{exp}$ is the expected wellbore energy across a plurality of measurements locations n; i is an index representing measurement locations along the expected wellpath; $\kappa_i$ is a wellbore curvature at the measurement location i; $\tau_i$ is the expected tortuosity at the measurement location I; $\Delta D_i$ is a change in depth at the measurement location i; $D_n$ is a depth at survey point i; $\Delta D_n$ is a change in depth across a plurality of measurement locations n; and where $D_n + \Delta D_n$ is a total length between depths; and $\Delta D_n$ is a change in depth across a plurality of measurement locations n.

14. A non-transitory computer-readable medium storing instructions that, when executed by a processor, cause the processor to:
calculate an expected wellbore energy for a planned wellpath;
calculate an expected tortuosity of the planned wellpath;
calculate a first value indicative of probability of occurrence of a drilling event for drilling along the planned wellpath, based on the expected wellbore energy and the expected tortuosity;
measure an actual wellbore energy for a first portion of the planned wellpath, the first portion corresponding to a drilled portion of the planned wellpath;
combine the actual wellbore energy with a portion of the expected wellbore energy to create a combined wellbore energy value, the portion of the expected wellbore energy attributable to a second portion of the wellpath, the second portion corresponding to an undrilled portion of the planned wellpath; and
calculate a second value indicative of probability of occurrence of a drilling event for drilling along the second portion of the planned wellpath, based on the combined wellbore energy value.

15. The non-transitory computer-readable medium of claim 14, wherein the program further causes the processor to calculate an actual tortuosity based on an equation as follows:

$$T = \sum_{i=1}^{n} \frac{\alpha_{n-1} + (\Delta D \times \delta_i)}{D_i - D_{i-1}}$$

where T is the actual tortuosity of the wellbore; α is an inclination angle of the wellbore; ΔD is a distance between a first measurement location within the wellbore and a second measurement location within the wellbore; $\delta_i$ is a dogleg severity value; and $D_i$ is a depth along the wellbore at a measurement location i.

16. The non-transitory computer-readable medium of claim 14, wherein the expected tortuosity is calculated based on an equation:

$$T = \sum_{i=1}^{n} \frac{\alpha_{n-1} + (\Delta D \times \delta_i)}{D_i - D_{i-1}}$$

where T is the expected tortuosity of the wellpath; α is an inclination angle of the wellpath; ΔD is a distance between a first measurement location within the wellpath and a second measurement location within the wellpath; $\delta_i$ is a dogleg severity value; and $D_i$ is a depth along the wellpath at a survey location i.

17. The non-transitory computer-readable medium of claim 14, wherein the expected wellbore energy is calculated based on an equation as follows:
where $E_{exp}$ is the expected wellbore energy across a plurality of measurements locations n; i is an index representing measurement locations along the expected wellpath; $\kappa_i$ is a wellbore curvature at the measurement location i; $\tau_i$ is the expected tortuosity at the measurement location I; $\Delta D_i$ is a change in depth at the measurement location i; $D_n$ is a depth at survey point i; $\Delta D_n$ is a change in depth across a plurality of measurement locations n; and where $D_n + \Delta D_n$ is a total length between depths; and $\Delta D_n$ is a change in depth across a plurality of measurement locations n.

* * * * *